Patented Aug. 2, 1927.

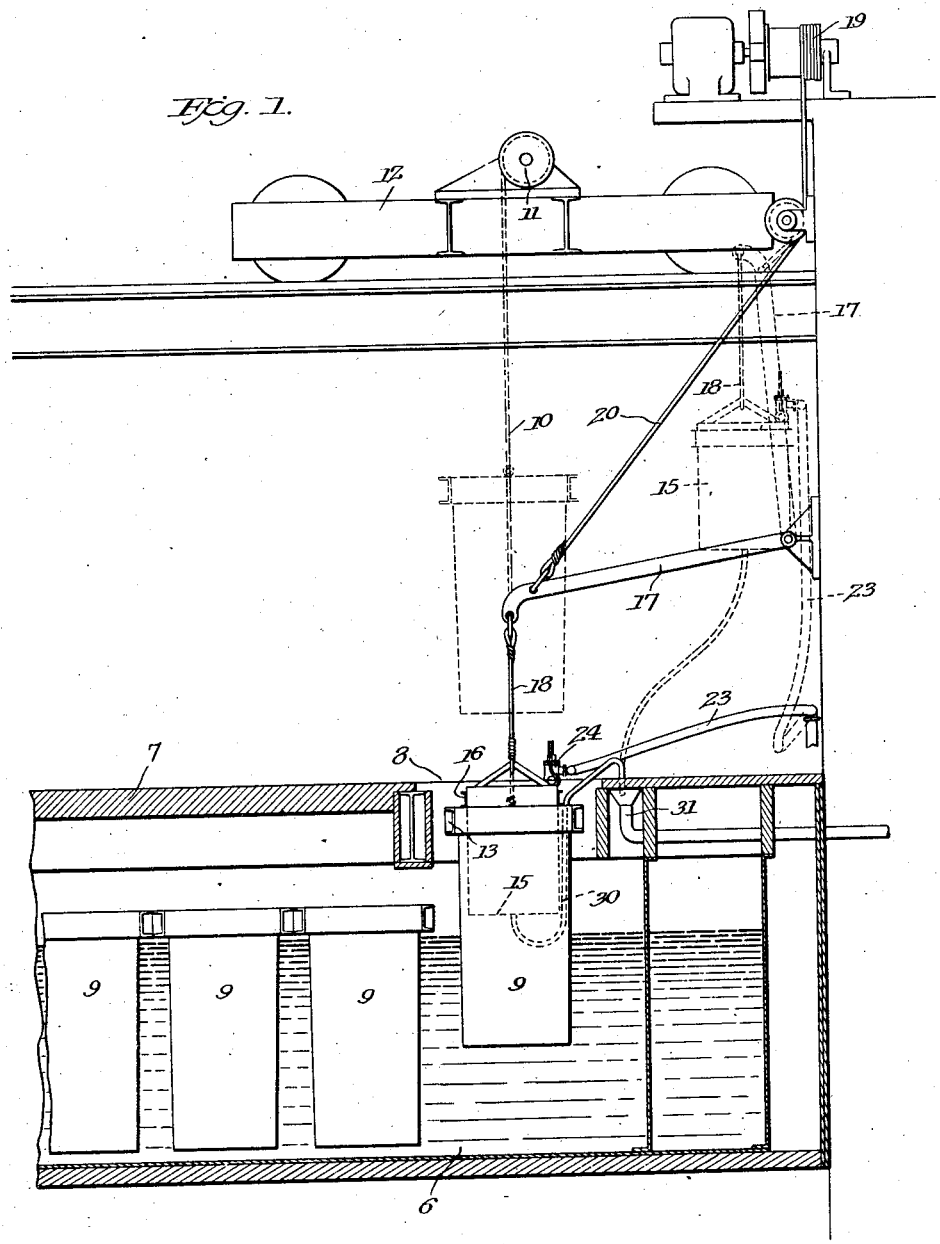

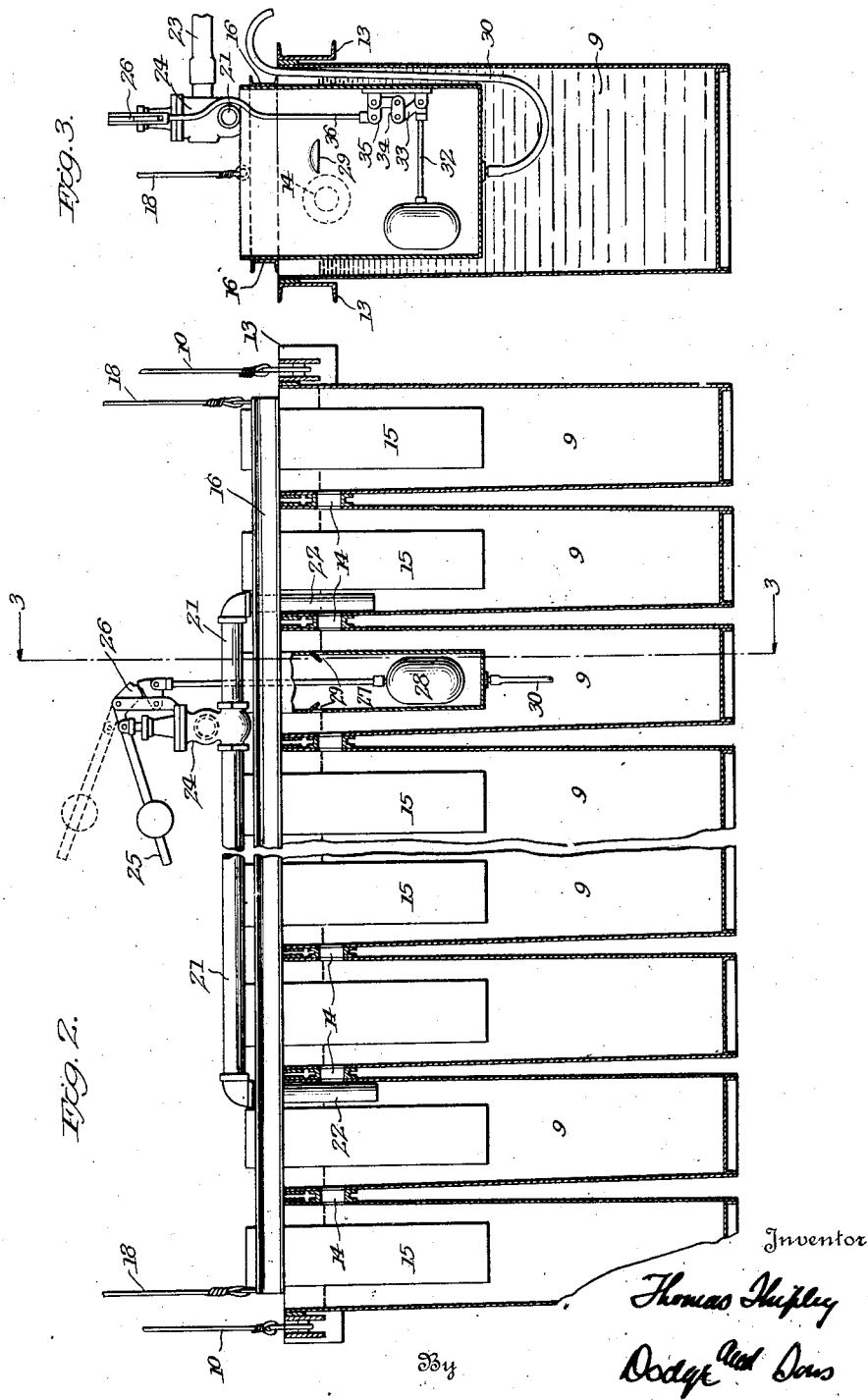

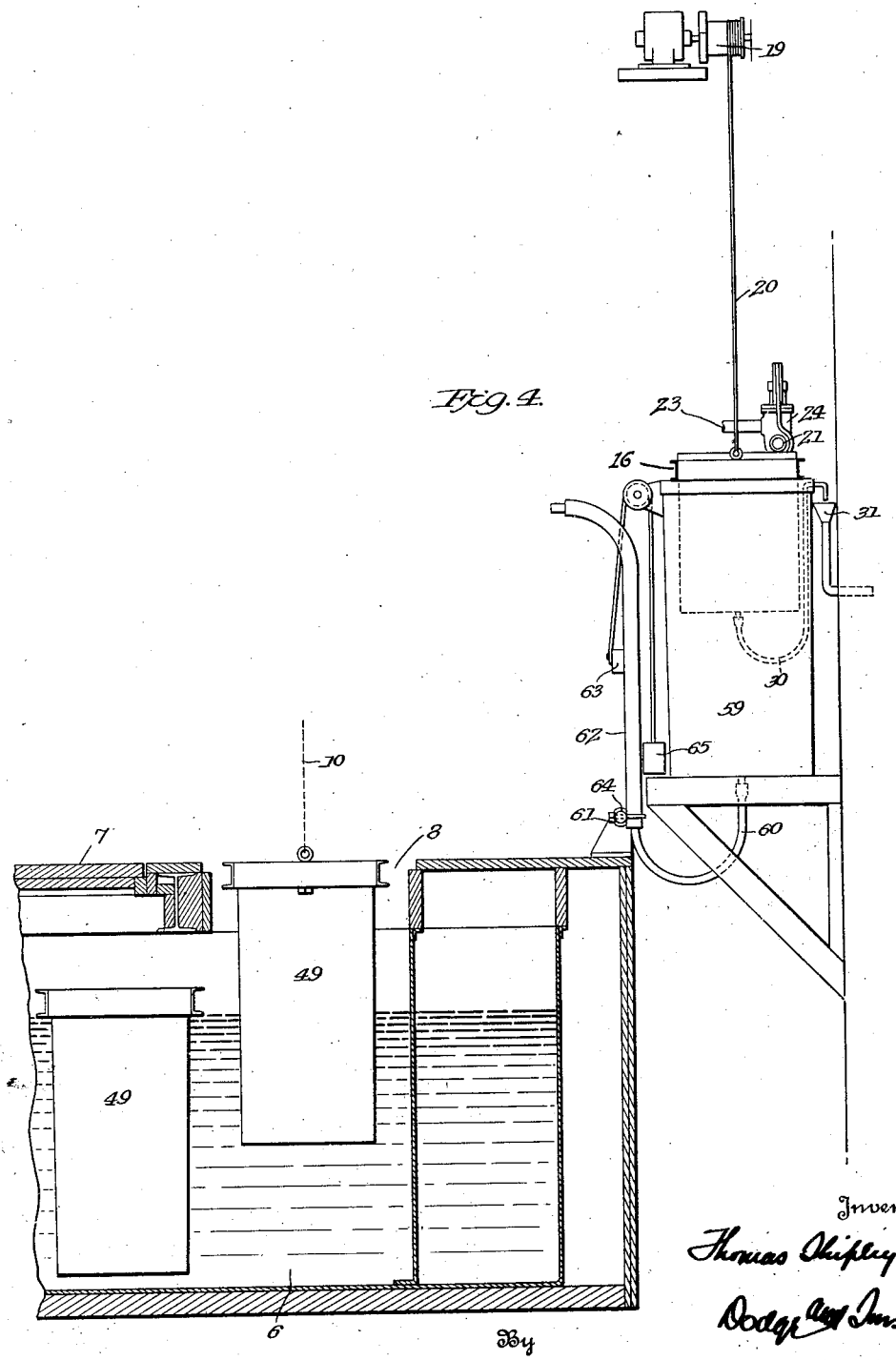

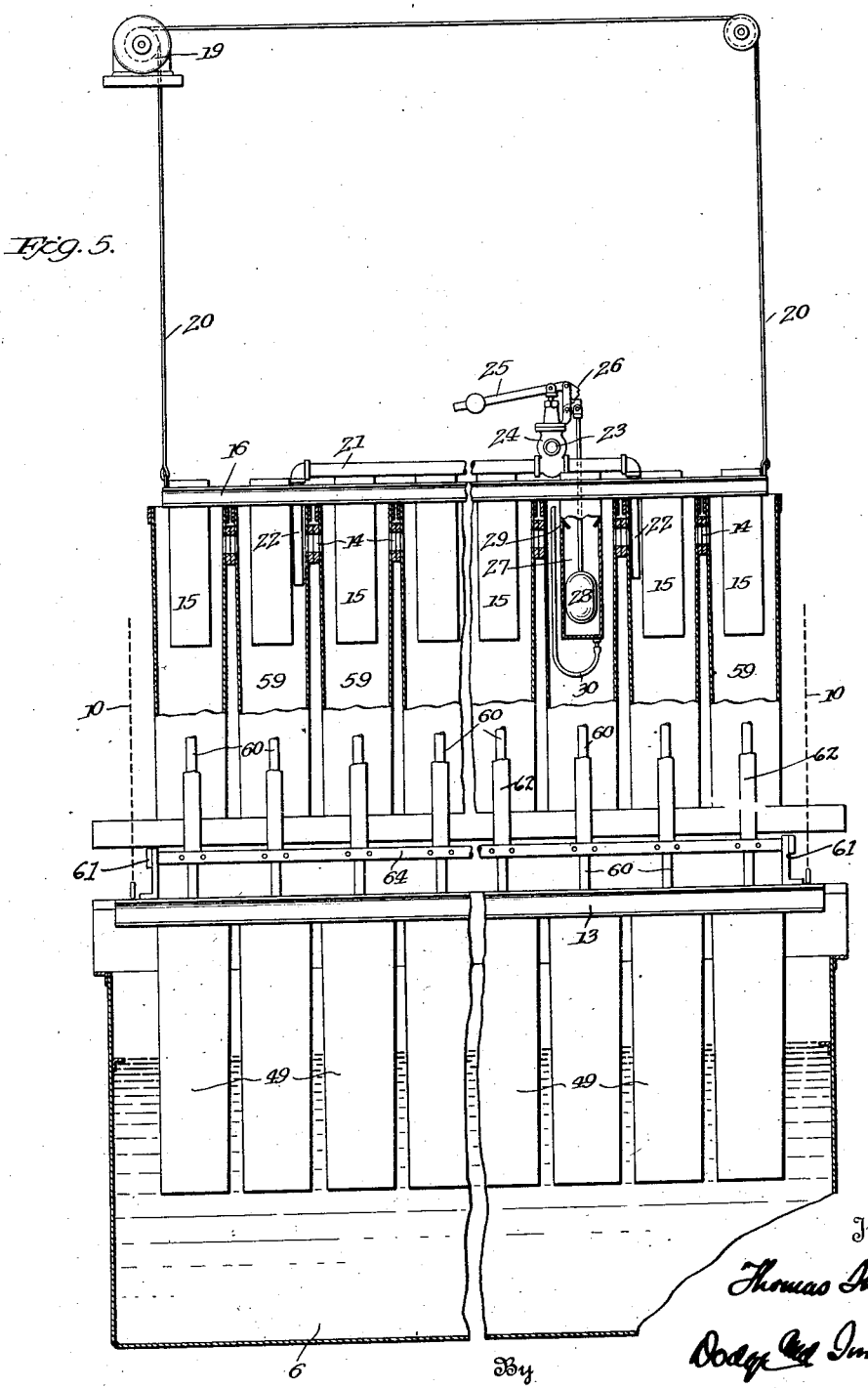

1,637,967

UNITED STATES PATENT OFFICE.

THOMAS SHIPLEY, OF YORK, PENNSYLVANIA, ASSIGNOR TO SHIPLEY PATENT CORPORATION, OF YORK, PENNSYLVANIA, A CORPORATION OF DELAWARE.

MEASURING CAN FILLER.

Application filed June 10, 1924. Serial No. 719,154.

This invention relates to liquid measuring devices, and particularly to measuring can fillers for use in can ice plants.

Many modern ice plants are equipped with can units made up of a plurality of cans rigidly connected together, and filled simultaneously. Such units must be filled quickly and as the larger ones now include twenty or more three-hundred-pound cans, the measuring device is called upon to deliver water very rapidly. Accuracy is required both by the trade, and by the need for uniformity of size in cakes piled in tiers in storage rooms.

The device forming the subject of the present application meets the above requirements, and may be successfully operated by unskilled labor.

Generally stated, it includes a plurality of measuring chambers communicating with each other by an overflow connection, a series of displacement bodies which are inserted during filling, and withdrawn after filling to cause the level in the chambers to drop below the overflow connection, and a float controlled cut-off for the water supply operating when the desired maximum equalized level in the chambers is reached prior to withdrawal of the displacement bodies.

As a convenient feature, the float is housed in one of the displacement bodies into which the water overflows at the maximum level to raise the float. This water is retained in the displacement body in the lowered condition of the bodies and is drained away in the raised position preparatory to the next measuring operation.

In the preferred embodiment, the ice cans themselves serve as the measuring chambers and consequently overflow connections between the various cans of the unit must be provided. Where it is not desirable to provide the cans of the unit with such overflow connections, the measuring may be done in a fixed set of cans or chambers, and these may be drained, by any suitable means, into corresponding ice cans at the completion of the measuring operation.

Both types of apparatus are illustrated in the accompanying drawings, in which:

Fig. 1 is a diagrammatic section through the can filling end of the brine tank, showing my can filling mechanism installed;

Fig. 2 is a longitudinal section through a multiple can unit with the displacement bodies lowered into the cans;

Fig. 3 is a section on the line 3—3 of Fig. 2;

Fig. 4 is a view similar to Fig. 1 and showing a modified construction;

Fig. 5 is a view looking to the right relatively to Fig. 4. Certain parts are shown in section and parts of others are broken away.

Although the invention is available for use generally, I show it in Fig. 1 as applied to a so-called pusher system, i. e., one in which the can units are filled at one end of the brine tank, lowered into the brine, moved step by step in series to the opposite or dumping end of the tank, and there withdrawn and dumped. After dumping, the can units are carried back to the filling end by a crane, which lowers them into filling position, and then lowers them further to their position in the brine tank.

The tank is shown at 6 and is provided with a covering or deck 7. The can units are lowered into the brine through a hatchway 8, extending across the filling end of the brine tank. One can unit, indicated generally by the numeral 9 applied to the end can of the unit, is shown suspended in filling position in the hatch-way 8 by means of cables 10 controlled by the hoist 11 on traveling crane 12. A number of filled can units are also shown in Fig. 1 as they appear when filled and lowered into the tank and on their way to the dumping end.

The can units comprise a plurality of cans 9 of familiar tapered form rigidly supported in a frame 13 of any suitable form. These cans have, near their tops, overflow connections 14, which are above the normal level of the water to be frozen in the cans, when the cans are properly filled.

To render the overflows 14 operative during the filling operation, the filling device includes a plurality of displacement bodies 15 of equal volume, one for each ice can, and a mechanism for positioning these bodies in the cans during and until the completion of the filling of the cans, and for withdrawing the same upon said completion. Such mechanism includes a frame 16, to which all the displacement bodies 15 are rigidly fastened, a pair of swinging arms 17 from which the frame 16 is suspended by cables 18, and a hoist 19 with cables 20 for raising and lowering the arms 17 simultaneously.

The frame 16 also carries a water pipe 21, which has branches 22 discharging into various of the cans. The water is supplied to pipe 21 from any suitable source through a flexible hose 23, and its flow is controlled by a valve 24. The valve 24 is constantly urged closed by a weighted lever 25, but may be latched open by means of latch 26.

The frame 16 and bodies 15 are of such weight that the submerged portions of the displacement bodies are insufficient to float them. One displacement body 15 (the third from the right in Fig. 2) is formed to provide a hollow chamber or receptacle 27 in which is mounted a float 28. Water may enter this chamber only through ports 29 near the top, when the water in cans 9 rises sufficiently high. When the frame 16 and displacement bodies 15 are raised to their upper positions, the chamber 27 is drained through a flexible hose 30 connected to a port in its bottom. The hose 30 hangs in a loop in the lower position of the displacement bodies, with its discharge end well above the maximum water level in the cans, so that the drain is then inoperative. The water drained away through hose 30 is carried off by waste connection 31 (see Fig. 1).

When the float 28 rises, it releases latch 26 through the following mechanism. The float is mounted on one arm 32 of a pivoted bell-crank whose other arm 33 is connected by a link 34 and a second bell crank 35, with draw rod 36. The rod 36 is connected to the movable nose of latch 26, and the parts are so arranged that the rise of the float moves the rod 36 downward, thus releasing the latch.

At the completion of the filling operation the displacement bodies will be in the raised position shown in dotted lines in Fig. 1, and the filled can unit will be lowered into the brine and moved from beneath hatch-way 8. The crane 12 now brings an empty unit and lowers it into hatch-way 8, ready for filling.

Hoist 19 is operated to lower frame 16 until it rests on the top of the empty can unit (see Figs. 2 and 3). Valve 24 is then latched open. Since the ports 29 are well above the bottoms of over flow connections 14, the water levels in all the cans 9 will have equalized before water enters chamber 27. When this occurs, float 28 will be raised tripping latch 26 and causing valve 24 to close.

Hoist 19 is then operated to raise frame 16 to its upper position, causing chamber 27 to drain. Hoist 11 is then operated to lower the filled unit into brine tank 6, and cables 10 are disengaged from this unit.

The modified constructions shown in Figs. 4 and 5 may be used where the ice can units do not have overflow connections between cans. In these figures parts essentially the same as those in Figs. 1 to 3 are similarly numbered.

The ice can units are indicated generally by the numeral 49, applied to the cans, and except that they lack the overflow connections, they are essentially identical with the units shown in Figs. 1 to 3.

The measuring is done in a series of fixed chambers 59, arranged with overflow interconnections exactly like those between the cans 9 in Fig. 2. In fact, the identical can unit shown in Fig. 2 could be used. The chambers 59 are provided with drain connections in their bottoms, each connected to a hose 60. A swinging frame is pivoted at 61 and includes a plurality of pipes 62 one for each hose, connected together by the cross members 63 and 64. The hose 60 pass through the pipes 62 and swing with them between an upright position in which their discharge ends are above the maximum water level in cans 59 and a lowered position in which these ends are below the bottoms of the can and above corresponding cans 49 of the empty can unit. In the latter position each chamber empties into a corresponding can 49 of the ice can unit. A counterweight 65 approximately balances this swinging frame.

Except that cables 20 from hoist 19 are connected directly to the ends of frame 16, so that the frame and displacement bodies have a right line vertical movement, the remaining parts are essentially identical in construction and operation with the structure of Figs. 1-3.

After the chambers 59 have been emptied the frame with pipes 62 is swung up. Frame 16 is lowered until it rests on the tops of cans 59. Valve 24 is latched open and remains open until it is automatically tripped by the use of float 28. Then frame 16 is hoisted and pipes 62 are swung down to discharge the measured charges into cans 42.

What is claimed is:

1. In a liquid measuring device, the combination of a plurality of measuring chambers having overflow connections with each other above the normal level of the measured charge of liquid therein; a liquid supply delivering to said chambers; an automatic level controlled valve subject to the level in said chambers and arranged to shut off said supply when the liquid level reaches a definite height above said overflow connections; displacement bodies movable into and out of said chambers and arranged to raise the level of the measured charge of liquid by displacement from below said connections to a level above the same when said bodies are in their displacing positions; and means operable to shift said displacement bodies.

2. In a liquid measuring device, the combination of a plurality of measuring chambers having overflow connections with each other above the normal level of the measured charge of liquid therein; displacement bodies movable into and out of said chambers and arranged to raise the level of a measured charge of liquid by displacement from a level below said overflow connections to a level above said connections when said bodies are in their displacing positions; a liquid supply delivering to said chambers; an automatic valve controlling said supply and arranged to be closed by rise of liquid to the higher level above named, said valve being movable with said displacement bodies into position to be actuated by the liquid in said chambers when the bodies are moved to their displacing positions; and means operable to shift said displacement bodies and valves.

3. In a liquid measuring device, the combination of measuring chambers having overflow connections with each other above the normal level of a measured charge of liquid therein; displacement bodies movable into and out of said chambers and arranged to raise the level of a measured charge of liquid by displacement from below said overflow connections to a level above the same when said bodies are in their displacing positions, one of said displacement bodies being provided with a receptacle arranged to receive liquid from that chamber by overflow therefrom at the desired maximum level of the liquid; a liquid supply to said measuring chambers; a valve arranged to be closed by the entrance of liquid into said receptacle and controlling said liquid supply; means operable to shift said displacement bodies to and from their displacing positions; and means serving to drain said receptacle when said displacement bodies are withdrawn.

4. In a liquid measuring device, the combination of measuring chambers having overflow connections with each other above the normal level of a measured charge of liquid therein; displacement bodies movable into and out of said chambers and arranged to raise the level of a measured charge of liquid by displacement from below said overflows to a level above the same when said bodies are in their displacing positions, one of said bodies having a receptacle housed therein and provided with a port through which liquid may flow into said receptacle from said chambers at the desired maximum level of liquid; a float controlled valve controlling said liquid supply and arranged to be closed by the rise of liquid in said receptacle; means operable to shift said displacement bodies to and from their displacing positions; and means serving to drain said receptacle when said displacement bodies are withdrawn.

5. The combination of a plurality of ice cans having overflow connections with each other above the desired level of water therein; a water supply for filling said cans and a supply controlling mechanism including a frame; a plurality of displacement bodies mounted thereon; supporting means for said frame arranged to move the same so as to insert said bodies into and withdraw them from said cans; and a float actuated valve mechanism controlling said water supply and arranged to be actuated by the rise of water to a definite point relatively to said displacement bodies.

6. The combination of a plurality of ice cans having overflow connections with each other above the desired water level therein; a water supply for filling said cans and a supply controlling mechanism including a frame; a plurality of displacement bodies mounted thereon, one for each can, and one displacement body having an overflow chamber therein; means for shifting said frame so as to insert said bodies into and withdraw them from said cans; and a valve controlling said supply and arranged to be closed by the entrance of water into said overflow chamber.

In testimony whereof I have signed my name to this specification.

THOMAS SHIPLEY.